(No Model.)
A. B. CURTIS.
VELOCIPEDE TREADLE.
No. 512,870. Patented Jan. 16, 1894.
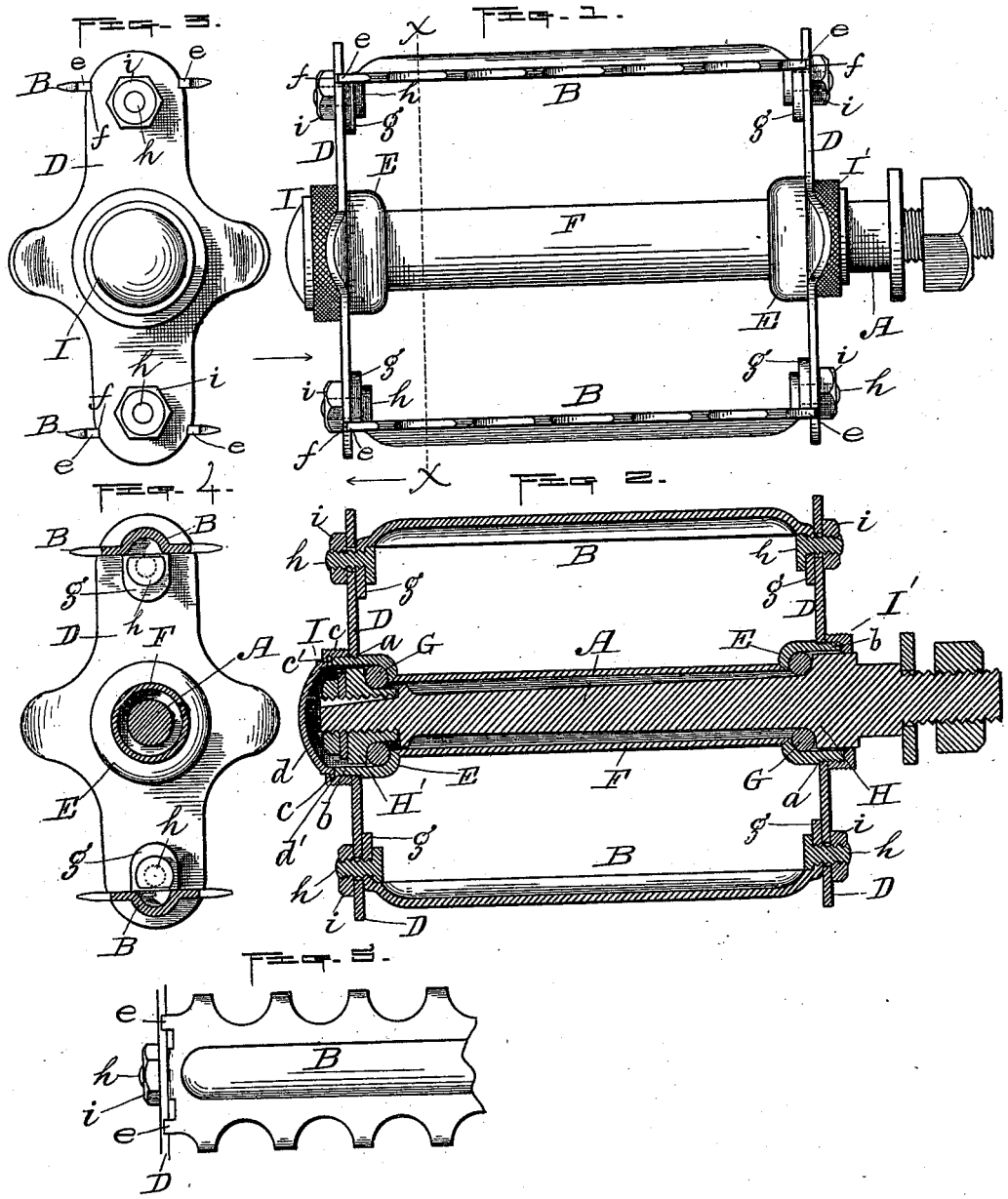
Witnesses:
Walter B. Nourse.
C. Forrest Wesson
Inventor,
Albert B. Curtis.
By Albert A. Barker Att'y
THE NATIONAL LITHOGRAPHING COMPANY,
WASHINGTON, D. C.

UNITED STATES PATENT OFFICE.

ALBERT B. CURTIS, OF WORCESTER, MASSACHUSETTS.

VELOCIPEDE-TREADLE.

SPECIFICATION forming part of Letters Patent No. 512,870, dated January 16, 1894.

Application filed May 4, 1892. Serial No. 431,789. (No model.)

*To all whom it may concern:*

Be it known that I, ALBERT B. CURTIS, of the city and county of Worcester and State of Massachusetts, have invented certain new and useful Improvements in Velocipede-Treadles; and I do hereby declare that the following is a full, clear, and exact description thereof, reference being had to the accompanying drawings, forming a part of this specification, and in which—

Figure 1 represents a plan of my improved velocipede treadle. Fig. 2 is a central, longitudinal section thereof. Fig. 3 is an outer end view of the treadle. Fig. 4 is a transverse section taken on line $xx$ Fig. 1, looking toward the outer end, and Fig. 5 is a side or edge view of the outer half of the treadle.

My invention consists of certain improvements in the construction of the treadle-bearings, the dust-guards thereof and the foot-rest bearings of a velocipede-treadle, as will be hereinafter set forth.

To enable those skilled in the art to which said invention appertains to better understand the nature and purpose thereof, I will now proceed to describe it more in detail.

In the drawings, A represents the central spindle or axis, B B the foot-rests and D D the end plates which support said foot-rests of the treadle; said end plates are in turn supported by the cup-shaped bearings E E which also form bearings for the ends of sleeve F, and the friction-balls G,—the latter being interposed between said outer bearings and the usual cone-bearings H H' on the spindle.

The bearings E E are threaded on the outside from their outer ends to a point in line with the inner sides of the plates D D when fitted in position, and the openings in said plates are also threaded to receive the same. The bearings are turned into said plates from the inside of the treadle up to a shoulder $a$ formed on each bearing, thus forming threaded hubs $b$ outside of the end plates to which the dust-guards I, I' may be secured. Said dust guards are made in two parts $c$, $d$, the part $c$ being in the form of an internally threaded collar adapted to be screwed onto the outer threaded hub $b$ and having an inwardly projecting flange $c'$ at its outer edge which fits over an outwardly projecting flange $d'$ on the inner edge of the cap-piece $d$ to hold the latter in position, as is fully shown in Fig. 2 of the drawings. The outside of collar $c$ is preferably milled as shown, to facilitate turning the same, but I do not limit myself thereto. The dust-guard I' at the opposite end of the treadle, which has a central opening to receive the spindle A is constructed so as to be screwed onto the threaded hub $b$ as in the former instance, and fits the surface of the spindle as is also shown in Fig. 2.

The foot-rests B, B which are shown of the usual "rat-trap" pattern, I make no claim to, with the exception of the following improvement in the way of fastening the ends thereof to the end plates D, D. Upon each end of said foot-rests are formed two longitudinally projecting ears $e$, $e$, one at each side of said ends, which fit into suitable notches $f$ made in the edges of the end plates, as is shown in Fig. 3, the purpose of said ears and notches being to hold the style of foot-rests named from turning when fastened in position for use. They are fastened by forming an inwardly projecting flange $g$ on the ends thereof between the aforesaid ears $e$ $e$, and passing bolts $h$ through the same and the end plates which are held as usual by the nuts $i$.

By the above construction, it is obvious that the foot-rests are fastened in a very secure manner, while at the same time they are susceptible of being easily removed at any time by simply removing the holding nuts aforesaid. This feature I also make no claim to, broadly, it being common, as is well known, to make detachable foot-rests for velocipedes prior to my invention.

In practice it is designed to make the end plates, the "rat-trap" plates or foot-rests, the cup-shaped bearings E, E, and the dust-guards I, I' of sheet metal stamped or compressed into the desired shapes and threaded as described.

Ordinarily the bearings E and end plates D, when constructed of stamped sheet metal, are made in one piece, which I find is objectionable for the reason that the plates should be of soft tempered metal so that they will not break easily, while the bearings, serving as they do, to hold the balls in place and coming at the greatest wearing point should be of hard tempered steel.

By my invention it is obvious that the two parts named, being made separately, may be tempered as required, thereby entirely removing the objection referred to in the old style of treadles.

Having now described my invention, what I claim therein as new, and desire to secure by Letters Patent, is—

1. In a velocipede treadle, the spindle A, its cone-bearings and friction balls; sleeve F arranged over said spindle between the threaded, cup-shaped bearings E E; said bearings, adapted to be screwed into threaded openings in the end plates D D and projecting a short distance outside thereof; said end plates having openings, and notches $f$ in their outer ends whereby the foot-rests may be secured thereto, and the dust-guards I adapted to be screwed onto the threaded hubs of bearings E, as described, in combination with said foot-rests having inwardly projecting lateral flanges $g$ adapted to fit against the inner faces of plates D, and the longitudinally projecting flanges $e\ e$ at each side of said flanges $g$, adapted to fit into the aforesaid notches $f$ in plates D; bolts $h$ passed through flanges $g$ and said plates D and holding nuts $i$, substantially as and for the purpose set forth.

2. In a velocipede treadle, the combination of the sheet metal end plates D D having the notches $f\ f$ in the side edges of their ends; with the foot-rests B B having the inwardly projecting lateral flanges $g$ adapted to fit against the inside of plates D D, and the longitudinally projecting ears or flanges $e\ e$ at each side of said flanges $g$, adapted to fit into the notches $f f$; bolts $h$ passed through flanges $g$ and plates D, and holding nuts $i$, substantially as and for the purpose set forth.

ALBERT B. CURTIS.

Witnesses:
A. A. BARKER,
W. B. NOURSE.